March 22, 1960   K. W. PORTER   2,929,755
PLASTIC BLADES FOR GAS TURBINE ENGINES
Filed July 24, 1958
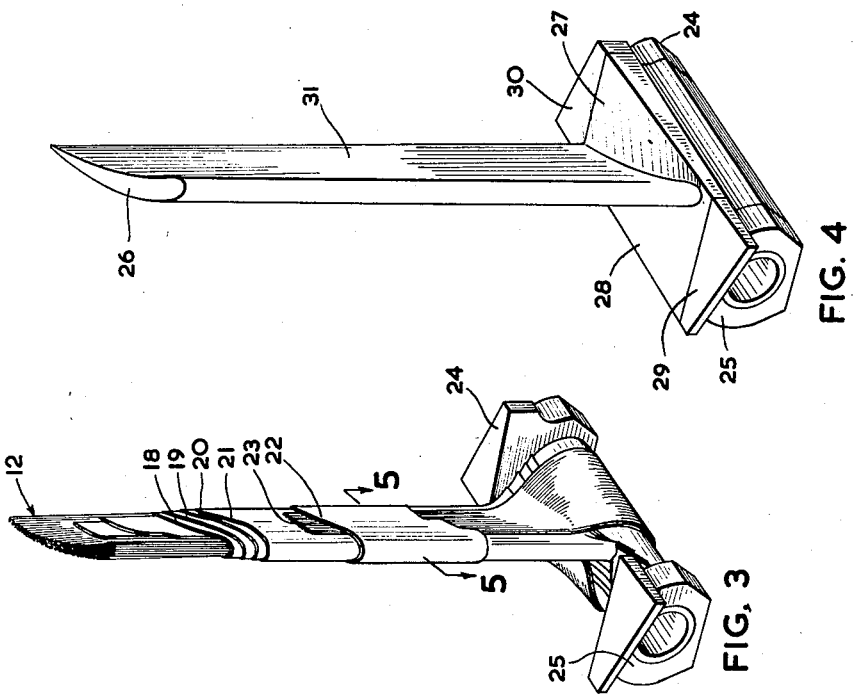
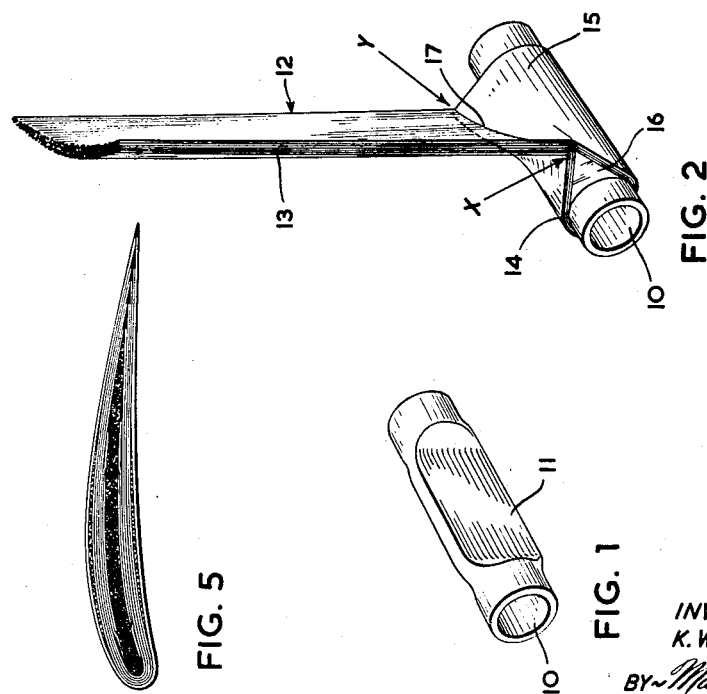
INVENTOR
K.W. PORTER
BY Maybee & Legris
ATTORNEYS United States Patent Office 2,929,755
Patented Mar. 22, 1960

2,929,755

PLASTIC BLADES FOR GAS TURBINE ENGINES

Kenneth Walter Porter, Caledon East, Ontario, Canada, assignor to Orenda Engines Limited, Malton, Ontario, Canada, a corporation of Canada Application July 24, 1958, Serial No. 750,816

3 Claims. (Cl. 154—90)

This invention relates to blades for use in gas turbine engines and, more particularly, to rotor blades for such gas turbine engines and to a method of making them.

In the manufacture of present day gas turbine engines one of the important considerations is the design of a blade which will have a high strength/weight ratio since the centrifugal loading on the blades reaches extreme values due to the high angular velocity of the rotor.

In addition, it is desirable to reduce the overall static weight of the engine and to reduce the cost of manufacture of the individual blade elements.

The present invention has as its principal object the solution of these problems and accomplishes this object by the provision of a light, strong, easily moulded reinforced blade of synthetic plastic material.

The method of manufacturing the blade will be disclosed in the following specification with reference to the accompanying drawings in which like reference numerals denote like parts in the various views and in which:

Figure 1 is a perspective view of a reinforcing spar which forms part of the root portion of the blade;

Figure 2 shows the spar of Figure 1 at a subsequent stage of manufacture;

Figure 3 shows the assembly of Figure 2 at a further stage of manufacture;

Figure 4 is a perspective view of the finished blade; and

Figure 5 is a section taken along line 5—5 of Figure 3.

Referring now to the drawings and in particular to Figure 1 the reinforcing spar or beam will be seen to comprise a tubular member 10 which has been flattened at 11 intermediate its two ends to provide for increased strength in the spar 10.

In Figure 2 the beam 10 shown in Figure 1 is illustrated as having filamentary rovings 12 of a material such as glass fibers doubled about it, the linear portions of the rovings 12 being indicated by the reference numeral 13 and the doubled portion bearing reference numeral 14. At this stage in the manufacture of the turbine blade the first moulding operation is carried out by the application of a suitable plastic material about the reinforcing beam and the rovings over a minor portion of their length and the formation of a rigid core at the root portion of the blade, the rigid core being shown in Figure 2 about the beam 10 and being defined by a surface 15 which will lie within the surface of the root portion of the finished blade. In other words, the dimensions of the rigid core 16 which is moulded in this first moulding operation are smaller than the dimensions of the root portion of the finished blade. The rigid core 16 is terminated, at one point, by a surface 17 which is parallel to the root platform of the finished blade and from this surface 17 the linear portions 13 of the glass fiber rovings 12 extend along a line which conforms to the general aerofoil contour of the finished blade.

This feature of the invention will be referred to later in this specification.

Referring now to Figure 3 it will be seen that as a subsequent step a series of woven fabric sheaths bearing reference numerals 18, 19, 20, 21 and 22 in Figure 3 are placed about the filamentary rovings 12 which sheaths may be supplemented by further filamentary rovings such as that shown at 23. The sheaths shown are to be construed as illustrative of the invention and not as limiting the scope of the claims to the number or type of sheaths shown. A greater or lesser number may be employed. End plates of metal which are suitably formed to the final configuration of the root portion of the blade are applied as at 24 and 25 over the protruding ends of the spar 10 and secured in position by any suitable bonding means such as by adhesives or by welding or brazing.

When the premoulded rigid core 16 and the filamentary rovings 12 have been processed to the stage shown in Figure 3 a second moulding operation is performed by applying a plastic moulding material over the entire assembly with the exception of the metal end plates 24 and 25 and forming the blade to the desired profile in a suitable press or form. During this second moulding operation the filamentary rovings 12 and the subsequently applied auxiliary rovings 23 are placed under tension by any well known means such as, for example, those disclosed in British Patent No. 775,816, which was published on May 29, 1957, in the name of Elmer P. Warnken for "Improvements Relating to Blades of Aerofoil Configuration."

The final stage in the manufacture of the blade comprises the step of trimming the finished blade to size by any required smoothing process over the surface of the blade and the root portion and by removing any "flashing" which may be present along the parting lines of the mould. Further, the tip 26 of the blade may require a finishing operation.

Referring once again to Figures 2 and 4 it will now be seen that the surface 17 which is formed in the rigid core 16 lies in a plane parallel to the plane containing the root portion 27 of the finished blade shown in Figure 4 which root portion is defined by surface 28 of the plastic moulding and by surfaces 29 and 30 of the metal end plates 24 and 25.

The purpose of premoulding the rigid core 16 adjacent the root portion of the blade in the first moulding operation is to provide a rigid anchor for the filamentary rovings 12 adjacent the root portion of the blade before the subsequent moulding operation during which tension is applied to them. Referring to Figure 2 it will be seen that if the moulding operation which resulted in the finished blade shown in Figure 4 were carried out as the only moulding operation then, in order to apply suitable tension to the rovings 12 to prestress the aerofoil portion of the blade it would be necessary to subject the rovings 12 to a sharp bend at the points indicated by the arrows X and Y in Figure 2. Such a sharp bend under the influence of the tension which is applied is detrimental to the stability of the finished blade since filamentary glass fiber rovings are subject to abrasion and breakage at this point both during the moulding operation and during the operation of the blade due to their close proximity to the surface of the blade as a result of the sharp bend in their length and the tension applied to them. Accordingly, by premoulding a rigid core 16 about the root portion of the blade before subjecting the rovings 12 to a strong tension it is possible to completely encase the doubled portion 14 of the rovings 12 with a suitable plastic material before tension is applied to them. This practice not only avoids the sharp bends which would otherwise take place during the application of tension but, in addition, stabilizes the whole structure during the subsequent operations and makes it much easier to handle during the final moulding operation.

Referring to Figure 4 it will be seen that during the moulding operation it will be possible to prestress the linear portion 13 of the rovings 12 which lie within the aerofoil portion 31 of the blade shown in Figure 4 without causing any bending in linear portion 13 of the rovings 12.

By this means blades may be easily and simply formed which have an extreme angle of attack relative to the axis of the spar 10 without the frequently encountered difficulties as a result of the bending of the reinforcing rovings.

Throughout the preceding specification the filamentary rovings 12 have been referred to as glass fiber strands but it is to be appreciated that, in addition to glass fibers, alternative filamentary reinforcing material may be used such as, for example, asbestos fibre. Many well known plastic materials are known which may be suitable for the plastic components of the blade and it is merely necessary to select from this known group one of the resins which will possess suitable characteristics having regard to the temperature at which the blade is to operate and the fact that the resin must be compatible with the filamentary reinforcing material which is used.

Having described the method of manufacturing the blades for use in gas turbine engines it is believed that it will be appreciated that a method has been devised which provides a blade having a high weight/strength ratio due to the fact that a prestressed lightweight plastic blade is employed and, at the same time, the overall weight of the engine will be reduced due to the fact that the blades manufactured in accordance with this invention will be lighter in weight than metal blades manufactured by conventional processes.

One of the principal advantages of the present invention is the fact that a greater tension may be applied to the rovings 12 than would be the case if the rigid root portion were not premoulded before the final moulding operation.

The invention has been described with reference to the accompanying drawings by way of illustration and the invention is intended to include all modifications which may fall within the scope of the appended claims.

What I claim as my invention is:

1. A method of moulding a reinforced plastic blade for use in gas turbine engines comprising the steps of doubling filamentary rovings about a reinforcing beam, applying a plastic material about the reinforcing beam and about the rovings over a minor portion of their length adjacent the reinforcing beam, moulding the plastic in a first moulding operation to form a rigid core at the root portion of the blade, the dimensions of the core being less than the dimensions of the root portion of the finished blade, the rigid core terminating at a surface parallel to the surface of the root platform of the finished blade with the rovings extending from this surface along a line conforming to the general aerofoil contour of the finished blade, then, in a subsequent operation aligning that portion of the rovings extending from the moulded core to lie along the lines parallel to the longitudinal axis of the blade, applying tension thereto, surrounding the core and the rovings with plastic material, moulding the entire blade in a second moulding operation to the desired profile in a form while maintaining the rovings under tension and finally removing the moulded blade from its form and trimming it to final size.

2. The method of claim 1 in which the rovings are sheathed in woven fabric layers prior to the second moulding operation.

3. The method of claim 1 including the step of applying metallic end plates to the end of the reinforcing beam after the first moulding operation and before the second moulding operation.

No references cited.